United States Patent

[11] 3,543,862

[72] Inventors Philip D. Wenzel
Rockford;
Gerald L. Gallagher, Loves Park, Illinois
[21] Appl. No. 763,109
[22] Filed Sept. 27, 1968
[45] Patented Dec. 1, 1970
[73] Assignee J. I. Company
a corporation of Wisconsin

[54] TRIP MECHANISM FOR GROUND WORKING IMPLEMENT
8 Claims, 7 Drawing Figs.

[52] U.S. Cl. .................................................... 172/264
[51] Int. Cl. ............................................... A01b 61/04
[50] Field of Search .......................................... 172/264, 710

[56] References Cited
UNITED STATES PATENTS

| | | | |
|---|---|---|---|
| 3,032,122 | 5/1962 | Geurts .......................... | 172/264 |
| 3,191,688 | 6/1965 | Morkoski et al. .............. | 172/269 |
| 3,202,223 | 8/1965 | Fulton ........................... | 172/264 |
| 3,321,027 | 5/1967 | Johnson et al. ................ | 172/266 |
| 3,326,300 | 6/1967 | Morkoski et al. .............. | 172/264 |
| 3,416,611 | 12/1968 | Fischer .......................... | 172/264X |
| 3,461,973 | 8/1969 | Geurts ........................... | 172/705X |

Primary Examiner—Robert E. Bagwill
Assistant Examiner—Alan E. Kopecki
Attorney—Dressler, Goldsmith, Clement and Gordon ABSTRACT: A tillage implement having a plurality of spaced ground working tools, with safety trip means for each tool allowing the tool to move from a normal ground penetrating position to a position elevated thereabove when an obstruction, such as rock or a stump, is encountered. Each ground working tool is mounted for free swinging movement between the ground penetrating position and a fully elevated position above the ground, and the tool is positively guided to and from the ground working position, with the guiding means functioning to allow the ground working tool to initially move out of the ground penetrating position without substantial downward movement into the ground, and with the guiding means also functioning to direct the ground working tool back into the ground at the proper angle of reentry. Hydraulic cylinder means continuously biases each tool toward the ground penetrating position, with the hydraulic cylinder means yieldably resisting movement of the tool away from the ground penetrating position and returning the ground working tool into the ground penetrating position after the obstruction has been cleared.

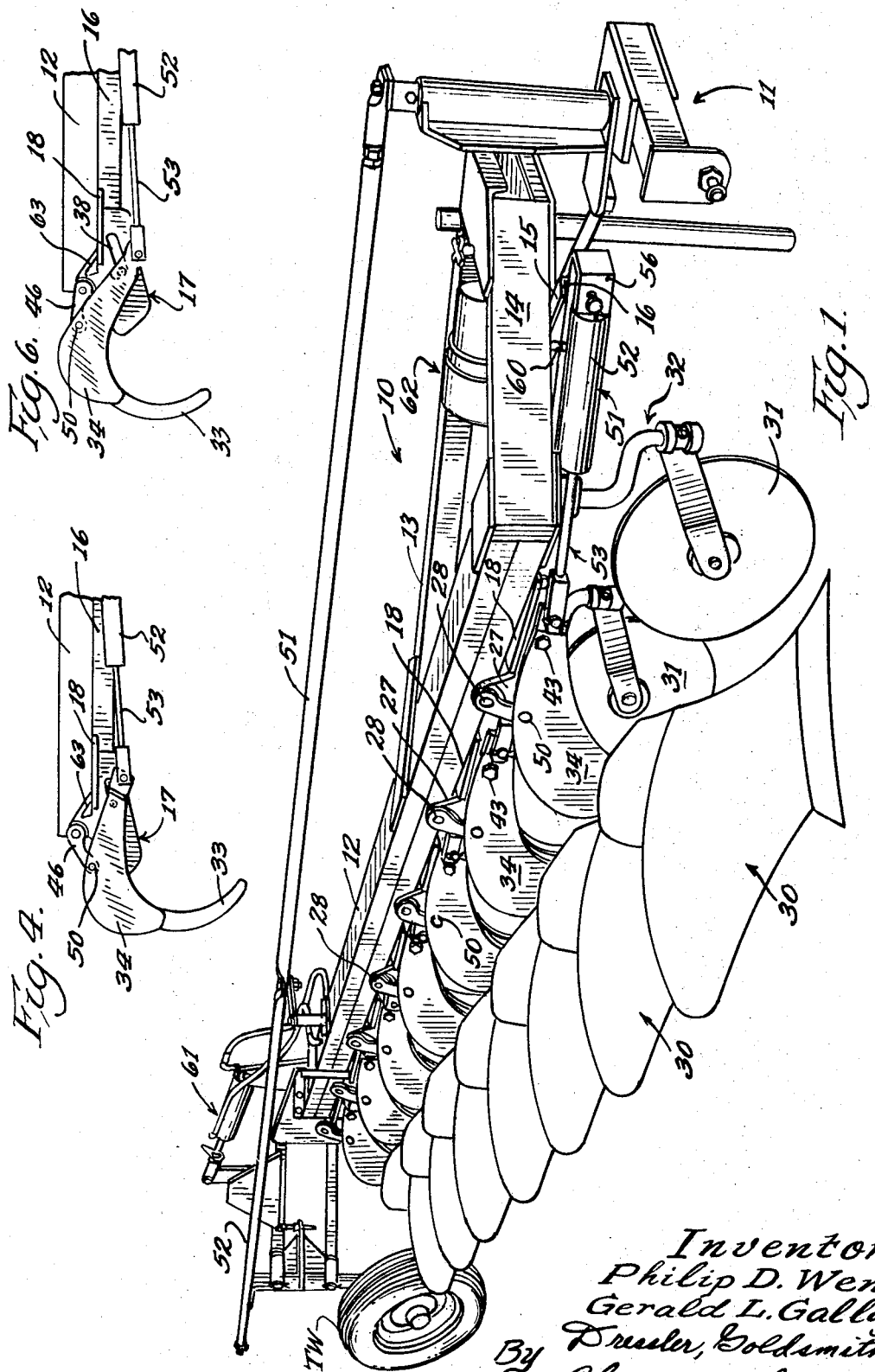

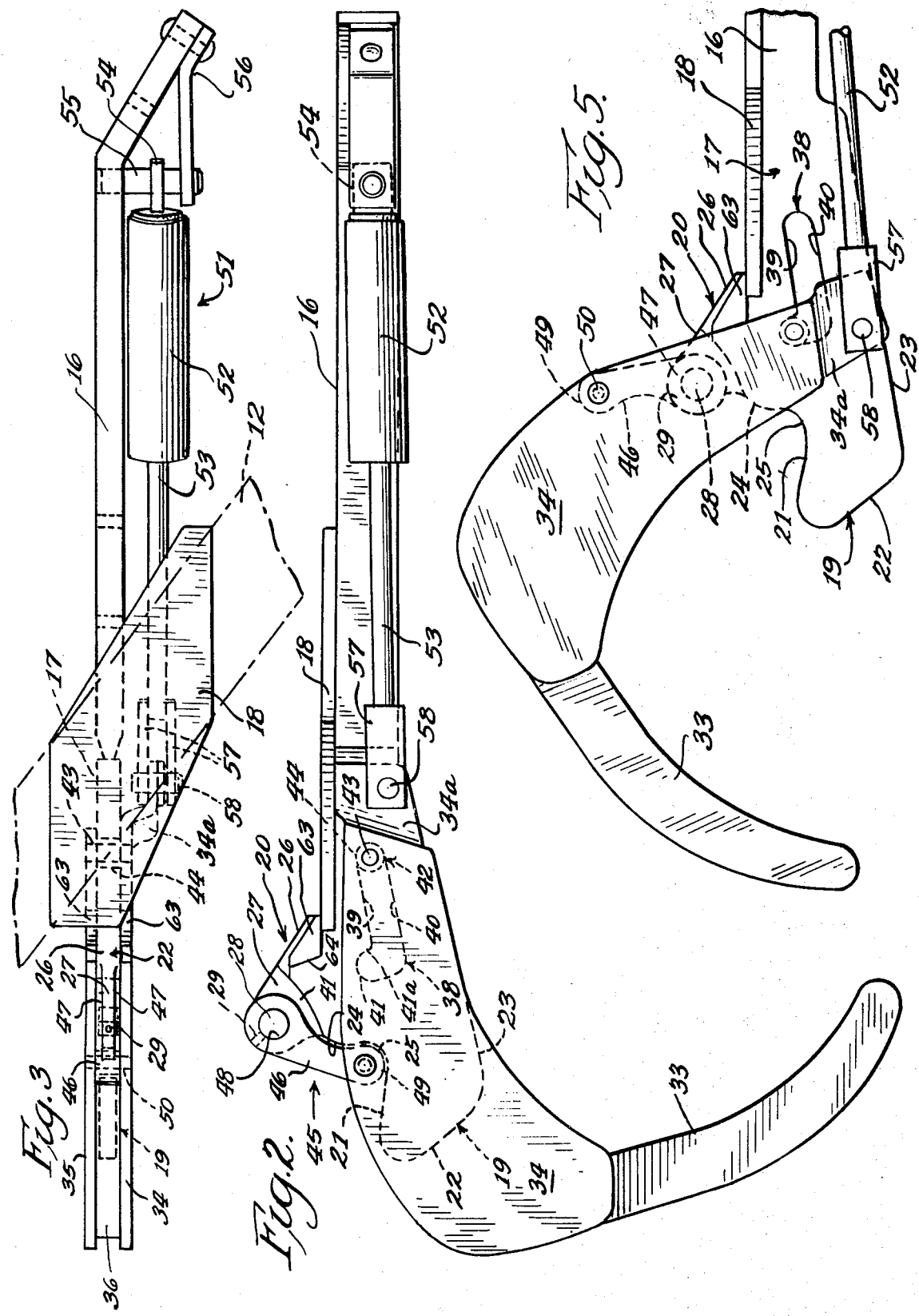

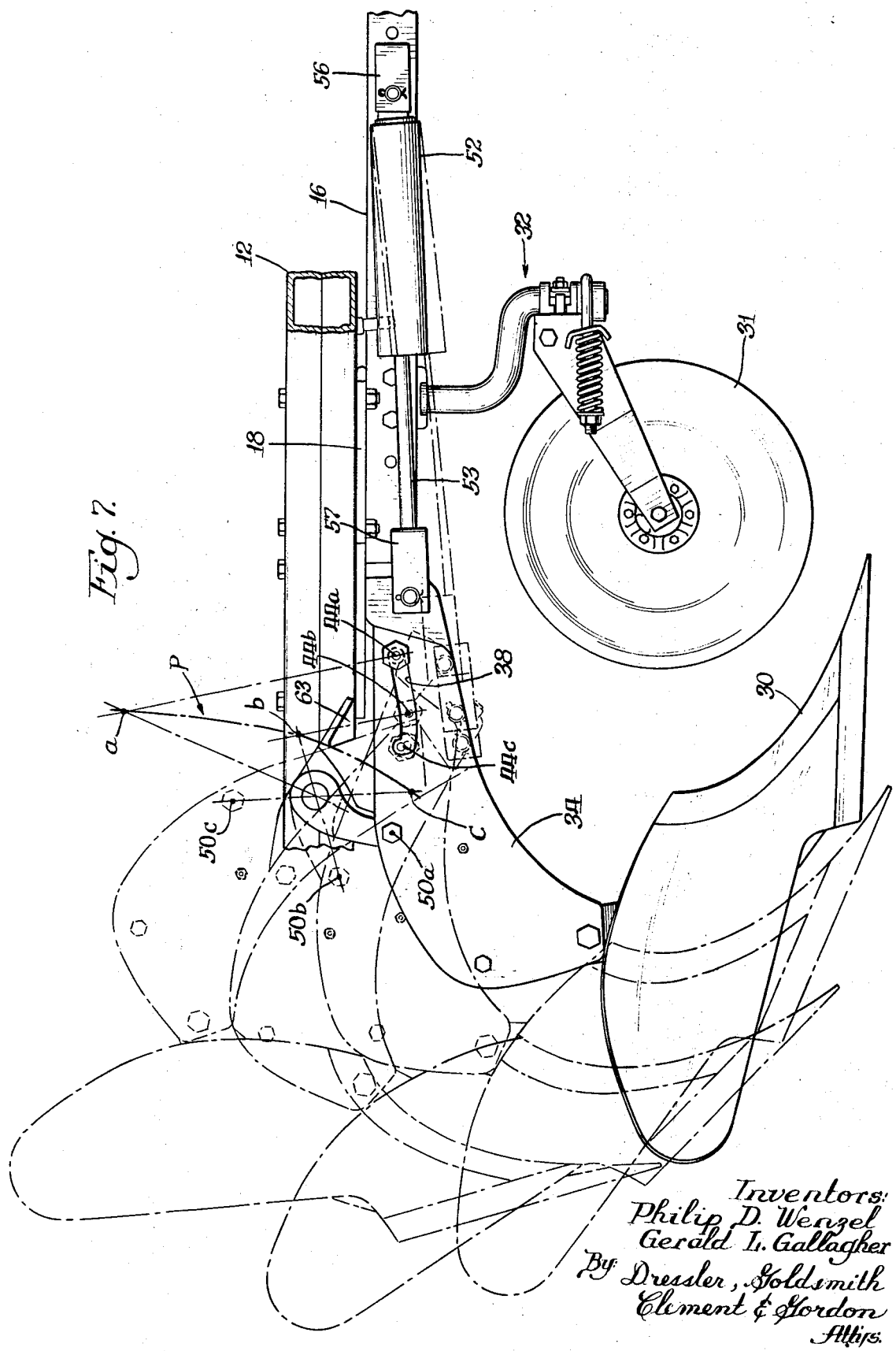

3,543,862

TRIP MECHANISM FOR GROUND WORKING IMPLEMENT

BACKGROUND OF THE INVENTION

Tillage implements having safety trip mechanisms for protecting a ground working tool against damage when an obstruction is encountered have been well known in the past. It is also well known to automatically return the ground working tool from a tripped obstruction clearing position to a normal or operating ground penetrating position by spring means or hydraulic cylinder means, thereby avoiding the necessity of having to stop the tractor and manually reset the tool.

In safety trip mechanisms employing hydraulic cylinder means for automatically returning the ground working tool to the operative ground penetrating position, it has been conventional to have the piston rod fully extended from the cylinder during normal ground tilling operation, with the piston rod being movable inwardly of the cylinder when an obstruction is encountered. This arrangement has proven to be extremely undesirable, since the exposed portion of the polished rod is subject to damage by rocks and the like, and also corrodes after an extended period of use.

One of the recent innovations in safety trip mechanisms has been the provision of a "high pivot" which enables the ground working tool to move out of the ground penetrating position without substantial initial movement downwardly into the ground. Such structures have not proven entirely satisfactory, in view of their failure to provide suitable structure for positively guiding the ground working tool during its entire movement between the ground penetrating and tripped positions. In known "high pivot" trip mechanisms, the ground working tool is pivoted directly upon the implement frame. This limits the movement of the ground working tool relative to the frame to pure pivoting movement, and does not allow the initial movement of the tool from the ground penetrating position to be along a flat shallow arc. The pure pivotal movement also does not set up the proper angle of reentry of the tool into the ground when it returns to the ground working position.

In certain types of safety trip mechanisms, the ground working tool is releasably latched in the operative ground penetrating position with resilient means biasing the latching structure, so that the ground working tool is free to move slightly during use without tripping. The latched type of safety trip mechanism is undesirable in many respects, in that it requires a rather complicated latching mechanism, which is not only expensive to manufacture and maintain, but which is also subject to wear and breakage after extended periods of use.

Recognizing the deficiencies of the latched type of safety trip mechanism, it has been recently proposed to provide a safety trip mechanism of the "free floating" variety wherein the ground working tool is free to move out of the ground working position against the bias of a spring or a hydraulic cylinder. In "free floating" mechanisms that have been proposed to date, complex and costly linkage structures have been employed to support the ground working tool for movement out of the ground penetrating position and back thereto, unduly increasing the initial cost of the implement, and complicating maintenance problems in use.

It has also been proposed to provide an automatic reset safety trip mechanism of the "free floating" type with cooperating cam and cam follower means on the tool and frame, respectively, with such means cooperating to allow the ground working tool to move out of the ground working position along a shallow flat arc and to guide the tool back into the ground at a proper angle of reentry. While this proposed structure represents a significant improvement over known types of automatic reset safety trip mechanisms, it does have certain drawbacks. Firstly, the shaping of the cam surfaces is somewhat critical to obtain the desired controlled guiding of the ground working tool. Furthermore, the means for biasing the ground working tool toward the operating ground penetrating position force the cam followers against the cam surfaces with a relatively large force, and this leads to wearing of both the cam surfaces and the cam followers. Additionally, relationship of the cam surfaces is such that the maximum resetting force of the biasing means is applied to the ground working tool at a position intermediate the ground penetrating position and the fully elevated position, so that optimum reentry conditions are not established.

SUMMARY OF THE INVENTION

The safety trip mechanism of the present invention is of the automatic reset variety, and includes hydraulic cylinder means for constantly urging the ground working tool toward the ground penetrating position, and for returning the ground working tool to the ground penetrating position when it moves away therefrom. In contrast to prior art latched type of trip mechanisms, the trip mechanism of the present invention allows the ground working tool to move freely along an unobstructed path in moving from and back into the ground penetrating position.

The trip mechanism of the present invention includes novel cooperating guiding and mounting members on the implement frame and on the ground working tool for insuring that the ground working tool will move out of the ground penetrating position without moving deeper into the ground, and for reentering the ground at the proper angle of suck.

In applicant's trip mechanism, the ground working tool is continuously urged toward the ground penetrating position by a hydraulic cylinder assembly that is connected between the tool and the implement frame. In applicant's arrangement, the piston rod is fully retracted in the ground penetrating position of the tool, in distinction to prior art arrangements wherein the piston rod is fully extended in the ground penetrating position of the tool. This arrangement allows the cylinder to protect the piston rod from external abuse during normal operation of the implement, and the piston rod is exposed for only a short duration when the ground working tool encounters an obstruction.

In applicant's "high pivot" arrangement, a cam surface is provided internally of the implement frame, and is in the form of an elongate, rearwardly extending, slightly downwardly inclined slot having an upraised portion at the rearward end thereof. A cam follower in the form of a roller is provided on the ground working tool and moves along the cam slot during movement of the tool between the operating ground penetrating position and a fully elevated position spaced above the ground. Coordinating linkage means, in the form of a single guiding link, is connected between the tool and the frame for controlling the movement of the tool into and out the ground penetrating position. The cam and linkage means are related to one another in a manner such that the ground working tool rotates about a continuously moving instantaneous center as the cam follower means moves along its cam surface and the single guiding link pivots during movement of the ground working tool between the ground penetrating position and the fully elevated position. The continuously moving instantaneous centers trace a curvilinear path, with the locus of the instantaneous centers being related to the biasing force of the hydraulic cylinder means such that the maximum biasing force is applied to the ground working tool in the ground penetrating position and the minimum biasing force is applied to the ground working tool in the fully elevated position.

With this unique arrangement, the hydraulic cylinder assembly provides a maximum force for resisting initial movement of the ground working tool out of the ground penetrating position, but once the ground working tool begins movement out of the ground penetrating position by engagement with an obstruction, the biasing force is gradually reduced, so that the ground working tool can readily move to an elevated position to clear the obstruction. Once the obstruction has been cleared, the hydraulic cylinder assembly returns the ground working tool to the ground penetrating position with a maximum resetting force.

BRIEF DESCRIPTION OF THE DRAWINGS

FIG. 1 is a front perspective view of a tillage implement utilizing the trip mechanism of the present invention;

FIG. 2 is an enlarged fragmentary side elevational view of the ground working tool and trip mechanism;

FIG. 3 is a fragmentary top plan view of the structure illustrated in FIG. 2;

FIGS. 4 and 6 are fragmentary side elevational view, similar to FIG. 2, but on a reduced scale and showing the ground working tool in positions intermediate the ground penetrating position and the fully elevated position;

FIG. 5 is a fragmentary side elevational view, similar to FIGS. 4 and 6, but on the scale of FIG. 2, and illustrating the ground working tool in the fully elevated position; and FIG. 7 is a change position diagram illustrating the relationship of the effective lever arm of the hydraulic cylinder assembly in the various positions of the ground working tool.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawing in detail, the trip mechanism of the present invention is illustrated in use with a moldboard plow type of tillage implement 10, it being understood that the trip mechanism could be used with other types of ground working tools. The tillage implement 10 includes a frame structure having a hitch mechanism 11 at the forward end thereof for connection to a tractive vehicle, such as a tractor. The hitch mechanism can be either of the "on-land" or "in-furrow" variety, as will be evident to those skilled in the art. The frame structure further includes a box frame member 12 that is disposed at an angle with respect to the direction of movement of the implement 10, as is well known. A longitudinally extending brace member 13 is secured to an intermediate portion of frame member 12, and extends forwardly therefrom. An inclined front frame member 14 is secured between the forwardmost portions of frame members 12 and 13. A steerable tail wheel TW is provided at the rearward end of frame member 12, and is actuated in a known manner by steering linkage means including steering arms S1 and S2.

The implement 10 includes a subframe structure for mounting a plurality of ground working tools, and the subframe structure includes an inclined frame member 15 (FIG. 1) secured to the lower portion of frame members 13 and 14, with frame member 15 being generally parallel with frame member 12. Each ground working tool is carried by a generally longitudinally extending beam member 16, and each beam member 16 has an extension portion 17 welded, or otherwise suitably secured, to the rearward end thereof. Each beam 16 and its extension 17 are welded to the lower surface of a mounting plate 18, and each mounting plate 18 is bolted, or otherwise suitably secured, to the underside of box frame member 12.

Each beam extension 17 is generally heart-shaped, and includes a lower lobe 19 and an upper lobe 20. Lower lobe 19 includes a generally horizontally disposed upper support surface 21, a generally downwardly and forwardly inclined rearward surface 22, and an upwardly and forwardly inclined bottom surface 23.

The upper lobe 20 includes an irregularly curved upwardly extending rearward surface 24 that merges with upper surface 21 of lower lobe 19 at a rounded junction 25. Upper lobe 20 further includes a downwardly and forwardly inclined upper surface 26 that terminates adjacent the upper surface of mounting plate 18. The upper portion 27 of upper lobe 20 is of reduced thickness to provide mounting means for linkage structure to be hereafter described. A transversely extending opening is provided in lobe portion 27 and a smooth, low friction bearing pin 28 is fixed therein by a set screw 29, or the like.

The present invention is illustrated in use with ground working tools in the form of moldboard plow bottoms 30, and trash cutting coulters 31 may be secured in cooperative relationship with bottoms 30 by suitable support structure 32. Each bottom 30 is secured to a plow standard 33 that is connected between a pair of spaced parallel side plates 34 and 35. Each side plate 34 includes a laterally offset forward portion 34a for connection to means for biasing the ground working tool toward a ground penetrating position, as will hereafter appear. Side plates 34 and 35 are positioned in sliding, face abutting engagement with opposite sides of beam extension 17 and derive lateral support therefrom. A spacer 36 (FIG. 3) may be secured between side plates 34 and 35 to retain them in spaced parallel relationship.

Cooperating structure is provided on each ground working tool and its supporting frame for not only mounting the tool on the frame, but also for constraining the tool for movement along a desired path relative to the frame. Said means includes an internal cam in the form of a longitudinally extending, slightly downwardly inclined slot 38. Slot 38 includes a generally rectilinear upper surface 39 which functions as a cam surface, and a generally rectilinear lower surface 40 which functions as a guiding surface. An upwardly extending notch 41 is provided at the rearward end of cam surface 39, and notch 41 is inclined slightly rearwardly. Cam follower means 42 is fixedly associated with each ground working tool 30, and the cam follower means 42 includes a roller 44 that is secured to the unthreaded central portion of a bolt 43, or other suitable pivot member, that extends between side plates 34 and 35, with roller 44 being disposed in slot 38 for movement therealong.

The mounting and guiding structure for each ground working tool 30 further includes coordinating linkage means 45, which cooperates with the cam and cam follower means to insure that each ground working tool moves away from the ground penetrating position along a shallow flat arc, and moves back into the ground penetrating position along the same arc. The coordinating linkage means 45 is in the form of a single link 46 that is connected between the beam extension 17 and the ground working tool 30. The link 46 has a bifurcated first end that defines spaced parallel ears 47 having opposed surfaces in face abutting engagement with opposite sides of the reduced portion 27 of lobe 20. Alined openings 48 are provided in ears 47, and are journaled upon the outer ends of pivoted pin 28. The second end 49 of link 46 remote from ears 47 is rounded to seat within junction 25, when the ground working tool is in the ground penetrating position. A pivot pin 50 extends transversely through the end 49 of link 46, with the ends of pin 50 being received in alined openings in side plates 34 and 35.

Biasing means 51 is connected between the implement frame and the ground working tool 30 for continuously biasing the tool 30 toward the operating ground penetrating position in all positions of the tool. Biasing means 51 yieldably resists movement of the tool away from the ground penetrating position, and automatically returns the tool to the ground penetrating position after movement away therefrom. Biasing means 51 is defined by a hydraulic cylinder assembly 52 having a reciprocable ram in the form of a piston rod 53 extending outwardly therefrom. In the normal ground penetrating position of the tool 30, (FIG. 2) piston rod 53 is disposed within cylinder 52, while in the fully elevated position (FIG. 5) the piston rod 53 extends outwardly from the cylinder 52.

The hydraulic cylinder assembly is removably mounted upon the implement frame, and to this end, an extension 54 extends forwardly from cylinder 52, with a pivot pin 55 extending through alined openings in extension 54 and in the forward portion of beam 16. Pivot pin 55 also extends through the opening in the rearward end of a bracket 56 that is secured to the forwardmost portion of beam 16. A pair of laterally spaced plates 57 are secured to the rearwardmost end of piston rod 53, and a transversely extending pivot pin 58 impales alined openings in plates 57 and the forwardly extending portion 34a of side plate 34.

Cylinder 52 is of the one way variety, and fluid under pressure is provided through a hose 60 (FIG. 1) to continuously urge the piston rod 53 inwardly of the cylinder 52. A suitable hydraulic circuit for providing fluid under pressure is disclosed in our commonly assigned U.S. Pat. application Ser. No. 763,271 filed concurrently herewith and entitled "Trip Mechanism Control". Such a system includes, for example, an accumulator 62 connected in the hydraulic circuit with hose 60 for providing fluid under pressure to retain the piston rod 53 in retracted position. As is described in the above-mentioned application, the accumulator 62 is preferably connected in circuit with hydraulic fluid means on the implement itself, such as in the hydraulic circuit to a cylinder assembly 61 for moving the tail wheel TW. As is explained in the above mentioned application, this provides a readily available fluid source of recharging the accumulator.

During a normal plowing operation, each ground working tool 30 is yieldably retained in the ground by its respective hydraulic cylinder assembly with cam follower roller 44 being disposed at the forward end of slot 38 and with the rounded end 49 of link 46 being disposed at the junction 25 on beam extension 19. When one of the tools encounters an obstruction, the tool 30 moves in a low flat arc out of the ground penetrating position toward a fully elevated position, and pivot 50 is constrained for movement in an unobstructed arcuate path by link 46, while cam follower roller 44 moves rearwardly along slot 38. During such movement, the tool 30 rotates about a continuously moving instantaneous center which traces a curvilinear path P as illustrated in FIG. 6. As is evident from FIG. 6, the effective lever arm of the biasing means 51, i.e., the distance between the projection of piston rod 53 and the instantaneous center, has a maximum length when the ground working tool is in the ground penetrating position and has a minimum length when the ground working tool is in the fully elevated position.

When cam follower roller 44 moves into notch 41, the biasing means 51 retains the roller 44 against the forward surface 41a of the notch, and the forward surface 41a then serves as a fulcrum about which the ground working tool swings to the fully elevated position. A stop block 63 is welded, or otherwise suitably secured, to each side of lobe portion 20 of beam extension 19, and blocks 63 have upwardly and rearwardly inclined, rearwardly facing stop surfaces 64. When the ground working tool reaches the fully elevated position of FIG. 5, the upper edges of side plates 34 and 35 move into engagement with the stop surfaces 64, so that the stop members 63 cooperate with the engagement of roller 44 with the end of notch 41 to prevent the ground working tool from going over center.

The weight of the ground working tool and the bias of the hydraulic cylinder means then cooperate to return the ground working tool toward the ground penetrating position, and as the ground working tool approaches the ground penetrating position, the effective lever arm of the biasing means 51 gradually increases, as is evident from FIG. 6, so that a maximum reentry force is applied to the tool when it approaches the ground penetrating position. Linkage means 45 is coordinated with the cam means 42 in a manner such that the ground working tool 30 approaches the ground in a shallow arc, so that the tool will reenter the ground without difficulty and at the proper angle. To obtain this result, pivot 28 is located upwardly and rearwardly of slot 38, and the distance between pivots 28 and 50 of link 46 is substantially the same length as the length of slot 38. The reengagement of cam follower roller 44 with the forward end of slot 38 again properly locates the ground working tool 30 in the operating ground penetrating position.

We claim:
1. A tillage implement comprising:
   a frame;
   a ground working tool;
   means mounting said tool on said frame for free unobstructed movement away from an operating ground penetrating position toward a fully elevated position above the ground, said means guiding and constraining said tool for movement along a fixed path between said positions;
   said mounting and guiding means including linkage means connected between said frame and said tool and an elongate surface on said frame and a follower on said tool movable along said surface during movement of said tool between said operating ground penetrating position and said fully elevated position, said linkage means being defined by a single link connected adjacent one end to said frame at a first pivot and connected adjacent the other end to said tool at a second pivot, said single link and said elongate surface being arranged so that the instantaneous center of rotation of any two points on said tool at any position intermediate said ground penetrating position and said fully elevated position falls along a fixed path; and
   a single means continuously biasing said tool toward said operating ground penetrating position in all positions of said tool for yieldably resisting movement of said tool away from said position and for returning said tool to said position after movement away therefrom, the effective lever arm of said biasing means being related to the path of movement of the instantaneous centers of rotation of said cam follower means and said second pivot such that said lever arm is of maximum length when said ground working tool is in the ground penetrating position so that said biasing means generates a maximum biasing force when said tool is in said operating ground penetrating position.

2. A tillage implement as set forth in claim 1 wherein said biasing means is a hydraulic cylinder having its piston rod connected to said tool.

3. A tillage implement as set forth in claim 2 wherein the piston rod of said hydraulic cylinder is retracted when said tool is in said ground penetrating position and is extended when said tool is in said fully elevated position.

4. A tillage implement as set forth in claim 1 wherein said elongate surface is defined by a generally rearwardly extending slot in said frame.

5. A tillage implement as set forth in claim 4 wherein said slot includes a generally upwardly extending portion at the rearward end thereof.

6. A tillage implement as set forth in claim 1 wherein said frame includes means engageable with said link for locating said tool in the operating ground penetrating position.

7. A tillage implement as set forth in claim 1 wherein stop means is provided on said frame in the path of the tool to define the fully elevated position of the tool when the tool is positioned thereagainst.

8. A tillage implement as set forth in claim 1 wherein a plurality of ground working tools are mounted at spaced locations on said frame, said biasing means being defined by a hydraulic cylinder for each tool, each hydraulic cylinder having a piston rod connected to its respective tool.